Sept. 30, 1924.  1,510,088

C. C. HUGHES ET AL
DUMPING PRESS
Filed Sept. 18, 1923    2 Sheets-Sheet 1

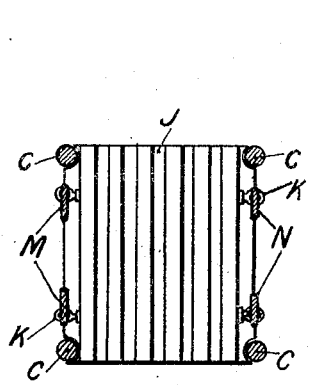
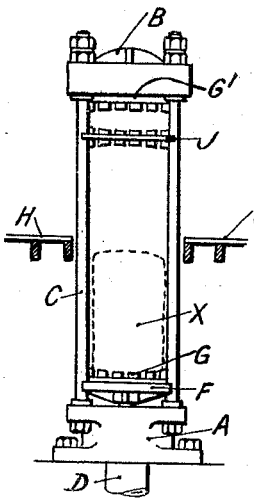
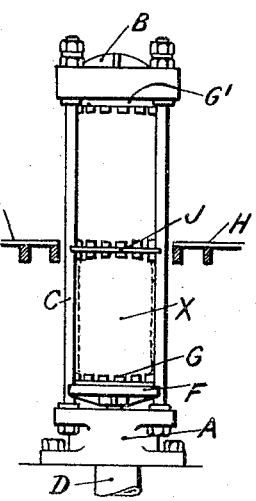
FIG. 3.    FIG. 4.    FIG. 5.
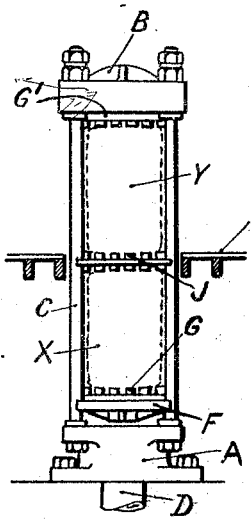
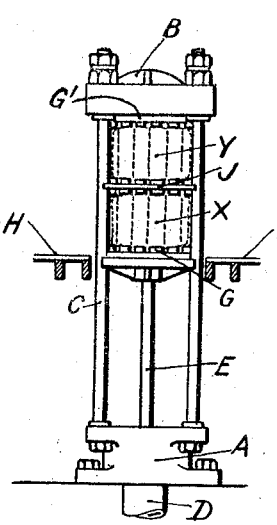
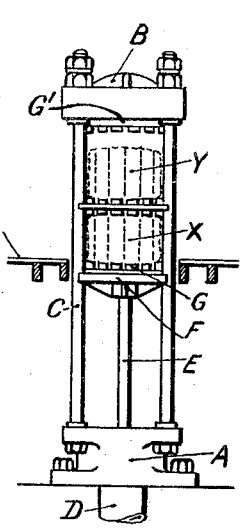
FIG. 6.    FIG. 7.    FIG. 8.

Patented Sept. 30, 1924.

1,510,088

UNITED STATES PATENT OFFICE.

CHRISTOPHER CULLEN HUGHES, OF BONDI, NEW SOUTH WALES, AND JOHN LEWIS, OF WAVERLEY, NEW SOUTH WALES, AUSTRALIA.

DUMPING PRESS.

Application filed September 18, 1923. Serial No. 663,440.

*To all whom it may concern:*

Be it known that we, CHRISTOPHER CULLEN HUGHES and JOHN LEWIS, subjects of the King of Great Britain and Ireland, and residents, respectively, of "Cambria," Murriverie Road, Bondi, in the State of New South Wales, Commonwealth of Australia, and "Colyton," Birrell Street, Waverley, in the State aforesaid, have invented certain new and useful Improvements in Dumping Presses (for which we have filed application in Australia, No. 11225, on the 24th February, A. D. 1923, and New Zealand, No. 49824, on the 20th March, A. D. 1923), of which the following is a specification.

This invention relates to the dumping of wool, cotton, hides and other goods in a dumping press having sufficient drift or space between the moving platen and fixed head to take two bales or two tiers of bales placed one above the other. This method of baling is known but hitherto has necessitated making two bales into one package.

The object of the present invention is to increase the rate and decrease the cost of dumping by rendering it possible to dump at one time two bales or two tiers of bales, one superposed on the other, in a press and to tie them individually, thus producing two or four, according to the capacity of the press, separate, dumped and tied bales at each stroke of the press.

The device supported on the platen and provided with grooves so that the ties can be inserted, is termed a follower, and a similar device is fitted on the underside of the head.

The present invention consists in the provision in a dumping press having sufficient drift to take two bales or two tiers of bales, of an intermediate floating follower which is double sided i. e. grooved on its upper and lower faces, and so arranged that in the dumping operation it is interposed horizontally between the lower and upper bales, and supported in such manner that it does not interfere with the free insertion or extraction of the bales. This follower is guided in any suitable way, conveniently by the press column.

When applied to a press arranged to receive both upper and lower bales from one and the same floor which is located about midway of the height of the press, the floating follower is supported by balancing means, such as ropes and a balance weight or weights, so that it may be easily lifted to the top of the press to permit the insertion of the lower bale and as easily drawn downwardly to rest on to the lower bale and thus permit the insertion of the upper bale which rests directly on the follower.

After the dumping and tying operations have been completed the platen is lowered sufficiently to release the pressure on the contents of the press and the upper bale is then removed; the floating follower is then lifted to permit the removal of the lower bale.

But in order that the invention may be clearly understood we shall now refer to the accompanying drawings depicting the improvements as applied to a dumping press which is illustrated more or less diagrammatically. In the drawings:—

Fig. 3 is a sectional plan on line 3—3 of Fig. 1.

Figs. 4, 5, 6, 7 and 8 are diagrammatic views in elevation depicting successively the operation of loading dumping and releasing the bales.

Figures 1, 2:
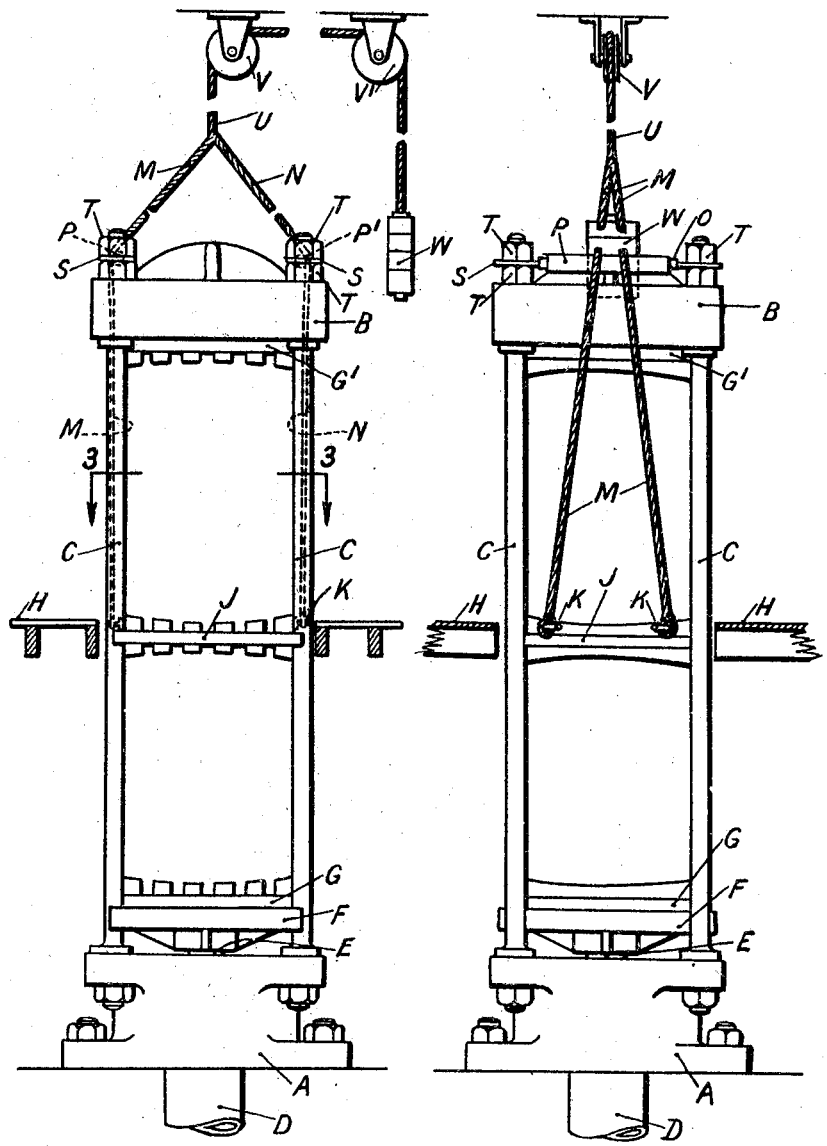
Fig. 1 is a front elevation of a hydraulic dumping press of the type referred to, and Fig. 2 a side elevation of the same.

The press of conventional type comprises a base A head B connected to the base by four columns C, cylinder D (shown broken), ram or plunger E, platen F, follower G supported on said platen, and follower G' affixed to the head B.

The construction of dumping presses is well known and further details need not be described as they have no bearing on the present invention.

The floating follower J is constructed similarly to the other followers with the exception that it is double sided and is guided by the press columns C. It is suspended at four points K by means of two pairs of ropes M and N which lead upwardly about tube guide rollers P and P' respectively. These guide rollers are mounted on rods such as O formed at each end into a palm S in which is a hole through which passes the upper end of one of the columns C, said palm being held between the terminal nuts T T on said column.

Above the guide rollers the suspensory ropes converge and are connected to one rope U which is received through over head pulleys V and V' and to its end is attached a weight W which counterbalances the weight of the follower J so that the latter is easily moved up and down as required.

The press is so arranged that the operating floor H is located about midway of the height thereof.

The method of operation is as follows:—

The floating follower J is first lifted as shown in Fig. 4 (and there maintained by the balance weight W), to permit the insertion of the first or lower bale X which is dropped on to the lower follower G. Follower J is then lowered on to the top of bale X as shown in Fig. 5 and the upper bale Y inserted as shown in Fig. 6. The press is then operated to dump the bales (as shown in Fig. 7) and the ties placed and secured on the separate bales. The platen is then permitted to descend (as shown in Fig. 8) sufficiently to release the upper bale which is thereupon removed. The floating follower is again lifted, the lower bale removed, and the platen permitted to descend to its first position in readiness for a repetition of the operation.

What we claim and desire to secure by Letters Patent is:

1. In a bale dumping press having sufficient drift between the moving platen and fixed head to admit two bales one superposed on the other, a double-sided floating follower arranged horizontally, means for temporarily supporting same in an approximately midway position in the press but permitting it to be moved towards one end thereof, and means for temporarily supporting it in a position near one end of the press.

2. In a bale-dumping press having sufficient drift between the moving platen and fixed head to admit two bales one superposed on the other, an intermediate double-sided floating follower formed to engage the press columns and be guided thereby, suspension cords connected to the follower at two opposite edges, and means connecting said cords to a weight counterbalancing the weight of said follower and serving to maintain same in any preselected position.

3. In a bale dumping press having sufficient drift between the moving platen and fixed head to admit two bales one superposed on the other, an intermediate double sided floating follower formed at its corners to at least partially embrace the press columns and slide thereon, suspension ropes attached to at least two opposite edges of said follower, and counterbalancing means attached to the other ends of said ropes.

4. In a bale-dumping press having sufficient drift between the moving platen and the fixed head to admit two bales one superposed on the other, an intermediate double-sided floating follower guided by the press columns, two pairs of suspension ropes attached respectively to opposite edges of said follower and at their other ends connected in common above the press to one end of a single rope passing about a pair of overhead pulleys, a weight attached to the other end of the last mentioned rope and serving to counterbalance the weight of said follower, and guide rollers mounted on the head of the press for the purpose of guiding said pairs of suspension ropes.

Signed at Sydney, New South Wales, this second day of August, A. D. 1923.

CHRISTOPHER CULLEN HUGHES.
JOHN LEWIS.